US007905771B2

(12) United States Patent
Walker et al.

(10) Patent No.: US 7,905,771 B2
(45) **Date of Patent: *Mar. 15, 2011**

(54) SYSTEMS AND METHODS FOR PRESENTING AN OUTCOME AMOUNT VIA A TOTAL NUMBER OF EVENTS

(75) Inventors: Jay S. Walker, Ridgefield, CT (US); Stephen C. Tulley, Fairfield, CT (US); James A. Jorasch, Stamford, CT (US); Daniel E. Tedesco, Huntington, CT (US); Geoffrey M Gelman, Stamford, CT (US)

(73) Assignee: IGT, Reno, NV (US)

( * ) Notice: Subject to any disclaimer, the term of this patent is extended or adjusted under 35 U.S.C. 154(b) by 229 days.

This patent is subject to a terminal disclaimer.

(21) Appl. No.: 12/270,398

(22) Filed: Nov. 13, 2008

(65) Prior Publication Data

US 2009/0061996 A1 Mar. 5, 2009

Related U.S. Application Data

(63) Continuation of application No. 10/793,345, filed on Mar. 4, 2004, now Pat. No. 7,452,270, which is a continuation-in-part of application No. 09/606,745, filed on Jun. 29, 2000, now Pat. No. 7,179,168.

(60) Provisional application No. 60/452,183, filed on Mar. 4, 2003.

(51) Int. Cl.
*A63F 13/00* (2006.01)

(52) U.S. Cl. ............... 463/17; 463/25; 463/42; 273/269

(58) Field of Classification Search .................... 463/14, 463/25, 42; 273/269
See application file for complete search history.

(56) References Cited

U.S. PATENT DOCUMENTS

| | | | | | |
|---|---|---|---|---|---|
| 5,324,035 | A * | 6/1994 | Morris et al. | ................... | 463/42 |
| 5,407,199 | A * | 4/1995 | Gumina | ........................ | 273/139 |
| 5,871,398 | A * | 2/1999 | Schneier et al. | ................ | 463/16 |
| 6,719,631 | B1 * | 4/2004 | Tulley et al. | .................... | 463/17 |
| 7,179,168 | B1 * | 2/2007 | Tulley et al. | .................... | 463/25 |
| 7,452,270 | B2 * | 11/2008 | Walker et al. | ................... | 463/17 |
| 2006/0160599 | A1 * | 7/2006 | Tulley et al. | .................... | 463/16 |
| 2006/0252490 | A1 * | 11/2006 | Tulley et al. | .................... | 463/17 |
| 2006/0252491 | A1 * | 11/2006 | Tulley et al. | .................... | 463/17 |

* cited by examiner

*Primary Examiner* — Dmitry Suhol
*Assistant Examiner* — David Duffy
(74) *Attorney, Agent, or Firm* — K&L Gates LLP

(57) ABSTRACT

Systems and methods are provided for operating a gaming system. In one embodiment, an outcome amount associated with a total number of events is determined. For example, a total payout amount associated with a number of randomly generated outcomes may be determined. Based on a parameter associated with a player, the outcome amount is allocated among and presented via the total number of events. The outcome amount may be allocated, for example, based on: a total number of events selected by the player; a total wager associated with a given number of events; and/or predetermined probabilities and/or per-event wager amount(s).

23 Claims, 4 Drawing Sheets

SYSTEMS AND METHODS FOR PRESENTING AN OUTCOME AMOUNT VIA A TOTAL NUMBER OF EVENTS

The present application is a Continuation Application of U.S. application Ser. No. 10/793,345, filed Mar. 4, 2004 in the name of Walker et al. and entitled SYSTEMS AND METHODS FOR PRESENTING AN OUTCOME AMOUNT VIA A TOTAL NUMBER OF EVENTS. U.S. application Ser. No. 10/793,345: (i) claims the benefit of U.S. Provisional Application Ser. No. 60/452,183, filed Mar. 4, 2003, (ii) is a continuation in part of U.S. patent application Ser. No. 09/606,745, entitled "SYSTEM AND METHODS FOR ALLOCATING AN OUTCOME AMOUNT AMONG A TOTAL NUMBER OF EVENTS", filed Jun. 29, 2000 and issued on Feb. 20, 2007 as U.S. Pat. No. 7,179,168 and (iii) issued as U.S. Pat. No. 7,452,270 on Nov. 11, 2008.

The entirety of each of the above applications and patents is hereby incorporated by reference herein for all purposes.

BACKGROUND

Many people enjoy the entertainment provided by various types of gaming systems. For example, many people enjoy playing games offered by casinos (e.g. slot machine, video poker and/or table games). In accordance with these types of games, a player may provide a monetary wager in exchange for which the player is provided with a random (or at least partially random) game result. Based on the wager and the game result, the player may become entitled to payment of winnings or an outcome amount.

One reason players enjoy these types of games is the presence of an element of player participation, such as the participation provided by allowing a player to select a wagering strategy or to offer predictions relative to forthcoming game results. Players also enjoy the excitement and gratification provided by the large potential payouts associated with many such games.

Casinos currently utilize several techniques to accommodate and entertain gaming device players. Such techniques include the provision of complimentary goods and services; employing attractive colors, graphics and architectural themes; sound effects associated with wining game results; thematic games (including games based on various elements of popular culture); and jackpots or "bonus rounds" that offer players the chance to win large sums of money in exchange for a comparatively small wager.

A need exists for enhancing the entertainment and overall appeal of gaming systems.

DETAILED DESCRIPTION

Figure 1:
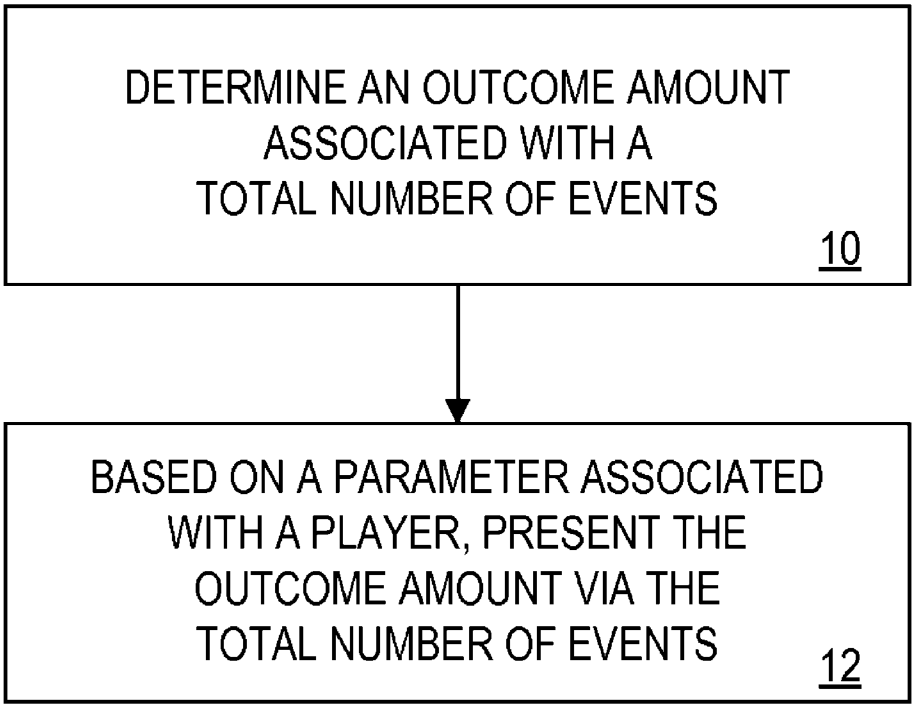
FIG. 1 is a flow chart of a method that may be performed according to an embodiment of the present invention.

Numerous embodiments are described in this application, and are presented for illustrative purposes only. The described embodiments are not intended to be limiting in any sense. The invention is widely applicable to numerous embodiments, as is readily apparent from the disclosure herein.

While the methods and apparatus of the present invention are described herein by way of particular embodiments, those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments" "one or more embodiments", "some embodiments", and "one embodiment" mean "one or more embodiments" unless expressly specified otherwise.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order.

It will be readily apparent that the various methods and algorithms described herein may be implemented by, e.g., appropriately programmed general purpose computers and computing devices. Further, programs which implement such methods and algorithms may be stored and transmitted in a variety of known media.

The steps of processes described herein may be performed in any order practical. Further, some steps may be performed simultaneously.

Various embodiments of the present invention allow a gaming device to present an outcome amount and/or total payout via a total number of events.

DEFINITIONS

The following definitions are used herein unless otherwise indicated.

Controller: An electronic device (e.g., a computer) that communicates with one or more gaming devices. The controller may be embodied as a computer server. The controller may (i) control the actions of gaming devices and/or (ii) receive and store information associated with the gaming devices. For example, the controller may employ one or more databases to record gaming device statistics such as e.g. coin-in, coin-out, jackpot information, theoretical wins, etc.

Event: A representation (e.g. graphical output) of the entitlement to at least a portion of an outcome amount. In various embodiments, an event may be embodied as a graphical representation of e.g. spinning reels on a slot machine display device. Further, the occurrence of an individual event may take place substantially simultaneously with the occurrence of one or more other events. Such events may function to indicate to a player the entitlement of a given portion of a total outcome amount. For example, where a player is entitled to receive $10.00 (an outcome amount), the $10.00 outcome amount may be allocated amongst a given number of events (the number of which may or may not be specified by the player). For example, where the player specifies that he or she would like to receive an outcome amount via a specified number of events, the gaming device and/or controller of the present invention may operate to display (i.e. indicate) the specified number of events to the player and to associate a given portion of an outcome amount with each of the individual events. For example, using the $10.00 scenario described above, and where the player specifies that he or she would like to be informed of the gaming result via the presentation of 20 individual events, the gaming device and/or the controller may operate to generate a graphical display representing a plurality of (in this case, 20) individual events. Each of the individual events may indicate to the player entitlement of a given portion of the outcome amount (e.g. ten events may each indicate that the player is entitled to $1.00, while 10 other events may indicate that the player is entitled to $0). Individual events may be associated with corresponding pay tables (e.g. a pay table based on a player's total wager and/or the outcome amount) and/or may be associated with a predetermined probability of indicating a given portion of an outcome amount. These particular aspects of the invention are described in detail herein.

Gaming Device Any electrical, mechanical, or electro-mechanical device operative to: accept wagers; execute a process to determine a game result and/or outcome amount; based on the game result and/or outcome amount, allocate the outcome amount among a given number of events; and provide entitlement to the outcome amount to a gaming device player. In accordance with a preferred embodiment, the game result and/or outcome amount may be generated or determined randomly (e.g. as with a slot machine). Alternatively, the game result and/or outcome amount may be generated or determined via a combination of randomness and player skill (e.g. as with video poker). In accordance with the present invention, gaming devices may include slot machines (both video reel and mechanical reel), video poker machines, video blackjack machines, video roulette machines, video keno machines, video bingo machines, pachinko machines, video lottery terminals, hand held gaming devices, and the like.

Event Result The form via which an individual event value is conveyed to the player and/or the resolution of an individual event. For example, an event result may be graphically represented to a player to depict a "cherry-cherry-cherry" result on a set of slot machine reels. The graphic representation may be output to the player via a gaming device output device and (as described above) may be indicated to the player substantially simultaneously with at least one other event result.

Event Value/Event Payout: An indication of a monetary amount associated with an individual event and/or event result. In accordance with the present invention, an event value may be calculated based on a wager amount associated with a given event; based on an applicable pay table (described below); and/or based on a total wager associated with a spin/handle pull. Generally, a total payout is determined randomly and is equal to the sum of all event values.

Outcome Amount/Total Payout: The total value to be allocated among all individual events. As discussed above, the outcome amount/total payout may be randomly determined in response to a player establishing a wager at a gaming device. The outcome value/total payout may be utilized to determine one or more individual event value(s). As discussed above, the outcome value/total payout may be calculated based on a wager amount associated with a given event; based on an applicable pay table (described below); and/or based on a total wager associated with a spin/handle pull.

Parameter: Information associated with a player and based on which an outcome amount is apportioned into individual event values and distributed among individual events. For example, a parameter may be embodied as input from a player specifying a particular number of events over which to allocate an outcome amount/total payout. Alternatively, a parameter may be embodied as a wager amount to be associated with one or more individual events and/or with a given number of events.

Spin/Handle Pull: An occurrence of the determination of an outcome amount. In accordance with the present invention, a spin/handle pull yields an outcome amount that may be communicated to a player via the gaming device. The outcome amount is then allocated over (or associated with) a given number of events. At least one event is then executed for the player and the individual event value(s) associated therewith are revealed or otherwise communicated to the player. A gaming device player may initiate a spin by depositing currency or establishing credit with a gaming device and subsequently actuating a lever or designated button.

In one embodiment of the present invention, an outcome amount associated with a total number of events is determined. The outcome amount is allocated among (or assigned to) each of the total number of events based on a parameter associated with a player. The total number of events may be, for example, greater than one.

For example, a player could access a Web site associated with a gaming service using a personal computer. The player supplies her credit card number to the gaming service during a registration process, and indicates that she prefers to win a smaller number of larger prizes (a preferred payout distribution). After registering, the player indicates that she would like to receive a certain "worth" of events (i.e. the player would like to place one or more wager(s) totaling $5.00). The gaming service charges a fee (e.g., $5.00 applied to her credit card account) and generates an outcome amount ($8.00) based on the total wager and the result of a random determination. The gaming service transmits information to the personal computer indicating that the purchased events will result in a total prize (e.g., $8.00) although this information is not displayed to the player.

This player initially decides to play a slot-machine type game. An electronic representation of a slot machine is displayed on her computer, and she decides to wager, e.g., $0.25 on each play of the slot machine (i.e. a $0.25 wager is associated with each of twenty events). The player's PC allocates the outcome amount (e.g., $8.00) among a certain number events (e.g., 20 events=$5.00/$0.25) using a random process. Because the player had indicated that she preferred to win a smaller number of large prizes, her PC randomly determines that the sixth event and the twelfth event will each be associated with a $4.00 prize and that the other events will be associated with no prizes (e.g. $0.00). If the player had instead indicated that she preferred to win a larger number of smaller prizes, her PC may have instead selected, for example, eight events to be associated with $1.00 each. In either case, the net payout amount to be presented to the player upon the completion of all events will be equal to the $8.00 outcome amount.

The player initiates the game by electing to reveal the first five events. Five individual sets of reels are displayed to the player. The reels are depicted to spin and each set is displayed to the player, thereby indicating an event result, and each time the slot machine reels indicate that no prize is won (i.e. five non-winning combinations are presented to the player).

She decides to try another game format offered by the gaming device (in this case, her PC), and selects a hidden-treasure maze game. In accordance with such type of game, the player maneuvers a character representation through a maze in an attempt to acquire and open graphically represented boxes. Each time the player finds and opens a box another event result is revealed. The player indicates that her remaining events (or the remaining event value) should be allocated among five boxes (events) in the maze. Her PC determines that each box is associated with a $0.75 wager ($3.75/5) and re-allocates the remaining event outcomes (still $8.00) as follows: $4.00, $0.00, $4.00, $0.00, and $0.00. When the player finds the first box, $4.00 is restored to her gaming service account. The player finds one more box and decides to stop playing the game. Her PC transmits information to the gaming service indicating that she has not yet wagered $2.25 and has not yet received $4.00 of her outcome amount.

The player later access the gaming service using her wireless telephone. She indicates that she would like to receive and play five electronic instant lottery scratch-off tickets. The gaming service determines that each ticket will be associated with a $0.45 wager ($2.25/5) and allocates her remaining $4.00 outcome amount as follows: $0.00, $0.00, $3.00, $0.00, and $1.00. The player plays all five tickets (events) and another $4.00 is credited to her gaming system account.

In another embodiment, it is arranged for a player to provide payment of an amount based on a total wager amount. An outcome amount is determined in response to the player providing the total wager amount. Based on a parameter associated with the player, the outcome amount is distributed among a plurality of e.g. representations of spinning slot machine reels (events). An event result associated with at least one of the events is revealed to the player, and it is arranged for the player to receive payment of an amount associated with the event result.

In still another embodiment, it is arranged for a player to provide payment of an amount based on a total wager amount. A gaming device determines an outcome amount (or total payout) which is presented to the player via a first total number of events. A modified number of events is then determined, and the outcome amount, (or a portion of the outcome amount), is re-allocated among the modified number of events according to at least one of: (i) a predetermined rule, (ii) a predetermined formula, (iii) a payout table, and (iv) a random process. The re-allocating comprises associating at least a portion of at least one event value with at least one of the modified number events. The event value (or event values) is/are revealed to the player, and it is arranged for the player to receive payment of an amount associated with the outcome amount.

In still another embodiment, an expected value associated with a player is determined. Based on a parameter associated with the player, the expected value is allocated among a total number of events.

In still another embodiment, it is arranged for a player to provide payment of a total wager amount. An indication associated with the total wager amount is transmitted to a controller, and an indication associated with a total payout amount is received from the controller. An indication associated with a total number of events is received from a player. Based on a parameter associated with the player, the total payout amount is allocated among the total number of events. At least a portion of the total payout amount is revealed to the player, and it is arranged for the player to receive payment of the total (revealed) payout amount.

In still another embodiment, an outcome amount associated with a player is determined. This outcome amount is allocated among a total number of events.

In still another embodiment, an outcome amount is determined, and, based on a parameter associated with a player, the outcome amount is allocated among a total number of events.

In still another embodiment, a plurality of outcome amounts associated with a prior total number of events are determined, the prior total number of events being more than a modified number of events. The outcomes amounts are then allocated among the modified number of events.

In still another embodiment, a series of event results is determined for an original number of events. The series of event results is then allocated among a modified number of events, both the original number of events and the modified number of events being greater than one.

In still another embodiment, a series of event results is determined for an original number of events, each of the series of event results being associated with a value within a predetermined range. The series of event results is then allocated among a modified number of events using at least one value outside of the predetermined range.

In still another embodiment, a series of event results is determined for an original number of events, at least one of the series of event results being associated with a negative value. The series of event results is then allocated among a modified number of events using at least one negative value.

Another embodiment of the present invention comprises: means for determining an outcome amount associated with a total number of events; and means for allocating, based on a parameter associated with a player, the outcome amount among the total number of events.

Another embodiment comprises: means for arranging for a player to provide payment of an amount based on a total wager amount; means for determining an outcome amount in response to the player providing the total wager amount; means for distributing, based on a parameter associated with a player, the outcome amount among a plurality of events; means for revealing to the player an event result associated with at least one of the events; and means for arranging for the player to receive payment of an amount associated with the event result.

Still another embodiment comprises: means for arranging for a player to provide payment of an amount based on a total wager amount; means for receiving, via a communication network, an indication of an outcome amount associated with an original number of events; means for allocating the outcome amount among the original number of events; means for determining a modified number of events; means for re-allocating the outcome amount among the modified number of events in accordance with at least one of: (i) a predetermined rule, (ii) a predetermined formula, (iii) a payout and/or probability table, and (iv) a random process, wherein said re-allocating comprises associating an event payout amount with at least one of the modified number of events; means for revealing the event payout amount to the player; and means for arranging for the player to receive payment of an amount associated with the event payout amount.

Still another embodiment comprises: means for determining an expected value associated with a player; and means for presenting, based on a parameter associated with the player, the expected value via a total number of events.

Still another embodiment comprises: means for arranging for a player to provide payment of a total wager amount; means for transmitting an indication associated with the total wager amount to a controller; means for receiving an indication associated with a total payout amount from the controller; means for receiving from the player an indication associated with a total number of events; means for presenting, based on a parameter associated with the player, the total payout amount among the total number of events; means for revealing at least a portion of the total payout amount; and means for arranging for the player to receive payment of the total payout amount.

Still another embodiment comprises: means for determining an outcome amount associated with a player; and means for allocating the outcome amount among a total number of events.

Still another embodiment comprises: means for determining an outcome amount; and means for associating, based on a parameter associated with a player, the outcome amount with each of a total number of events.

Still another embodiment comprises: means for determining a plurality of outcome amounts associated with a prior total number of events, the prior total number of events being more than a modified number of events; and means for allocating the outcome amounts among the modified number of events.

Still another embodiment comprises: means for determining a series of event results for an original number of events; and means for allocating the series of event results among a modified number of events, both the original number of events and the modified number of events being greater than one.

Still another embodiment comprises: means for determining a series of event results for an original number of events, each of the series of event results being associated with a value within a predetermined range; and means for allocating the series of event results among a modified number of events using at least one value outside of the predetermined range.

Still another embodiment comprises: means for determining a series of event results for an original number of events, none of the series of event results being associated with a negative value; and means for allocating the series of event results among a modified number of events using at least one negative value.

Still another embodiment comprises: means for determining an outcome value; means for determining a total number of events; means for associating each of the total number of events with either: (i) a positive event value representing a portion of the outcome value; (ii) a negative event value; or (iii) a zero event value; wherein the sum of the event values is equal to the outcome value.

Embodiments of the present invention are directed to systems and methods for presenting an outcome amount via a total number of "events" (e.g., by distributing the outcome amount among the total number of events based on a player-established event parameter). As used herein, an event may be any representation that is directly or indirectly indicated to a player. For example, an event may comprise an event result (e.g. "win" or "lose") that is displayed to a player. An event result may also comprise an event payout amount (e.g. "win one dollar" or "win five dollars") that is won by a player. Note that an event result may also comprise a negative amount ("lose three dollars", "−$2.00", etc.).

An event "parameter" is any variable associated with the play of the gaming system. For example, one event parameter is a "total number of events." That is, a player may purchase (wager upon) and receive a total number of events, each event being associated with an event result. Each of the event results would then be indicated to the player as he or she played the game. As one example, a game may simply comprise flipping a coin one time (e.g., a "heads" indicates that the player has won, and a "tails" indicates that the player has not won). In this case, the number of times the coin is flipped may represent the total number of events. Note, however, that each event may comprise a number of separate indications to a player. For example, a game may comprise flipping a coin three times (e.g., three "heads" indicates that the player has won, but at least one "tails" indicates that the player has not won). In this case, each set of three coin flips may represent a single event.

In the case of a gaming device such as a slot machine, a single spin or handle pull may be associated with an outcome value, and the handle pull may be associated with more than one event (e.g., more than one chance to win is provided with each spin).

Another event parameter may comprise a "total wager amount." The total wager amount may represent an amount of money that a player wagers (in one or more payments or transactions) with respect to a total number of events or relative to a given outcome value.

For example, a player may provide a payment of twenty dollars and be presented with twenty events via which the player is presented with an individual outcome value. Each event may resolve to entitle the player to a portion of the total outcome value. For example, each event may be resolved randomly based on a pay schedule. The pay schedule may be based on the portion of a player's wager associated with any single event (in this case, $1.00).

According to another embodiment, the total outcome value may be determined based on a total wager (e.g. based on a pay table and/or expected value associated with the total wager).

According to another embodiment, an "event wager amount," representing an amount of money that a player wagers with respect to a single event, is another example of an event parameter.

Another event parameter may be a "total payout amount." The total payout amount may represent an outcome amount entitled to the player with respect to a total number of events. For example, a player may play three slot-machine type games (i.e., associated with three events) and win or become entitled to a total of ten dollars (an outcome amount).

An "event payout amount," representing an amount of money a player wins with respect to a single event, is another example of an event parameter. As used herein, an "outcome amount" may be, for example, a total payout amount, an event payout amount and/or equal to the sum of a given plurality of event payouts.

Another event parameter is a "payout percentage." The payout percentage may represent the average event payout amount per event wager amount. For example, if a twenty dollar ($20.00) wager amount will, on average, result in an eighteen dollar ($18.00) outcome amount, the payout percentage would be ninety percent (i.e. $18/20=90/100$).

Another event parameter is an "expected value" associated with an event. The expected value may be computed, for example, by multiplying a potential event payout amount by a probability of winning. For example, if an event represents a thirty percent chance of winning two dollars and a seventy percent chance of winning nothing, the expected value associated with the event would be $0.60 (i.e., 0.30*$2.00).

Another event parameter is a "total time period." The total time period may represent an amount of time it takes to play a game associated with a total number of events. For example, if a player plays a racing game during which an event result is displayed to the player every twenty seconds, a game session associated with six events will have a total time period of two minutes. In accordance with certain embodiments of the invention, requisite wager amounts may be determined in response to the establishment of a total time period event parameter by a player. The requisite wager may be established in order to ensure e.g. a guaranteed wager volume over a given time period, which may be beneficial to a gaming system owner or operator.

Another event parameter is an "event format." The event format may represent the type of game to be presented to or played by a player. For example a first event format may represent a golf game (e.g., a game in which an individual event comprises a representation of a golf shot an in which a player may receive an event payout based on the proximity of the shot to a representative target) while a second event format may represent a card game (e.g. a game in which a player wins a prize if he or she is presented with representations of cards having a sum rank and in which event payouts are determined based on the sum rank relative to a previously established baseline).

They player may use a gaming device such as a slot machine or his or her Personal Computer (PC) to play a slot-machine type game. Each of a given number of event results (e.g. twenty event results) is revealed to the player. Each event result may be associated with a winning amount (an event payout amount) and the sum of all of the event payouts may be equal to a previously determined outcome amount or total payout. For example, for a given event, the player may be told that he or she has won fifty cents when three cherries (an event result) are displayed via representations of reels on an electronic slot machine. After the player has been presented with twenty events, he or she may be entitled to a total of four dollars (the total payout amount).

FIG. 1 is a flow chart of a method that may be performed according to an embodiment of the present invention.

At 10, an outcome amount associated with a total number of events is determined. For example, a total event payout may be determined in response to a player establishing a wager or balance with a gaming device. According to one embodiment, an indication of the player's request is transmitted from a player device (e.g., the gaming device or player's PC) to a controller. The controller may then transmit an indication of the total outcome amount to the player device. For example, a player may use a gaming device to establish an initial wager of $5.00 (e.g., by providing a payment of five dollars via a gaming device currency acceptor). In this case, the controller may transmit to the gaming device an indication that the player's five-dollar wager may entitle the player to a total outcome amount of four dollars. Note that, according to one embodiment, the controller does not allocate the four dollars (the outcome amount) among the individual events nor amongst the total number of events.

The determination of the outcome amount by a gaming device may comprise receiving an indication of the outcome amount from, for example, a controller, and/or an event result server (e.g., a server associated with a gaming authority, gaming device manufacturer operator or other third party). An indication of the outcome amount may be received via a communication network, such as the Internet, and or a wired or wireless telephone network. Various networks and associated communication protocol among devices are known to those of skill in the art and need not be described in detail herein.

In accordance with an embodiment of the present invention, the determination of an outcome amount may be performed in accordance with a random or pseudo-random process. For example, the gaming device of the present invention may access a pay table based on a wager received from a player and/or player device. The gaming device may execute a process to determine a random outcome amount. For example, the gaming device may generate a random number, which may be indexed to a corresponding value and associated with an outcome amount in a pay table (e.g. a pay table deemed applicable based on the player's total wager amount).

According to another embodiment, the determination of the outcome amount may instead comprise retrieving a stored indication of the outcome amount. The indication of the outcome amount may be retrieved from, for example, a database stored at a gaming device, a controller, or an event result server.

According to another embodiment, the determination of the outcome amount is performed by way of the controller randomly generating the outcome amount. For example, a controller may randomly generate the outcome amount using any random or pseudo-random process, similar to the process described above with respect to the gaming device.

Referring again to FIG. 1, at 12 the determined outcome amount is presented to the player via the total number of events. The method of presentation and/or the total number of events may be based on a parameter associated with a player.

The parameter associated with the player may be, for example, retrieved from one or more databases and/or indicated to the gaming device by way of one or more gaming device input(s). In accordance with some embodiments, the parameter associated with the player may be received from, for example, the player, a gaming device, a player device, a controller, and/or an event result server. According to one embodiment, the parameter associated with the player is received via a communication network, such as the Internet or a telephone network.

According to one embodiment, the outcome amount is presented to the player via a total number of events. The outcome amount may be presented based on the total number of events associated with the player and/or based on an initial wager associated with the player or received by the gaming device. By way of example, a gaming device may receive an indication that a player has wagered $10.00 and determine (via a random process) that the player is to be presented with a total payout amount of $14.00. The player device then allocates the $14.00 among a given number of events (e.g. a number of events specified or selected by the player). For example, the gaming device may simply select one of the given number of events and allocate the entire $14.00 to that event. The gaming device may alternatively, for example, select seven of the events and allocate or assign $2.00 (an event payout) to each of those events. Note however that an individual event payout associated with a given event need not be equal to all other event payouts. That is, the gaming device and/or the controller may assign one or more portion (s) of the outcome amount to individual events in any appropriate manner.

According to other embodiments, the outcome amount may be presented based on, for example, a player's payout distribution preference.

For example, the player may be provided with an interface (e.g., a graphical display on a touch screen, a set of physical buttons) which includes buttons or other controls. The buttons or other controls may be used by the player (e.g., actuating a button) to indicate various information, such as a payout distribution preference. The gaming device can determine which control or button was used and thereby determine, e.g., a payout distribution preference.

For example, a player may indicate his or her payout frequency preference and/or payout magnitude preference, by selecting one of: "less frequent but larger prizes"; or "more frequent but smaller prizes" on a touch screen displaying two graphical buttons. Based on these parameters gaming device and/or controller may then, for example, allocate an $8.00 outcome amount among ten events by allocating the $8.00 to two events (e.g., by allocating $4.00 to each of the two events) or to each of six events (e.g. by allocating $1.00 to four events and $2.00 to two events) as appropriate. Similarly, a player may indicate a preferred standard deviation associated with the allocation of the outcome amount.

A player may also indicate his or her event payout location preference. For example, a player may indicate that he or she prefers to receive more prizes towards the beginning rather than the end of a series of events. Similarly, a player may indicate his or her payout order preference (e.g., by indicating that small prizes should always by revealed before large prizes).

Other factors that may be used to present or allocate the outcome amount include, for example, a total wager amount, an event wager amount, a total time period, a game format and a random distribution. According to one embodiment, the outcome amount is allocated based on a payout currency preference. For example, a player may indicate that he or she agrees to receive half of the outcome amount in the form of a gift certificate to a particular merchant. Similarly, an outcome amount may be converted to frequent flyer miles, casino comp points, etc.

The allocation and presentation of the outcome amount may be performed, for example, by a gaming device, a controller and/or an event result server (e.g., a server associated with a casino owner/operator). The outcome amount may also be allocated and presented by a player device, such as a PC, a portable computing device such as PDA, a gaming device (e.g., a slot machine or a video poker machine), a wired or wireless telephone, a one-way or two-way pager, a kiosk, a Point of Sale (POS) terminal, and an Automated Teller Machine (ATM) device.

The allocation and presentation of the outcome amount may be performed in any number of ways. For example, a controller may select a subset of the total number of events and allocate the outcome amount among that subset. Consider the allocation of a $5.00 outcome amount among four events. The controller may first select the second and fourth events, and then allocate the $5.00 among those two events (e.g. $4.00 to the second event and $1.00 to the fourth event).

Alternatively, the gaming device and/or the controller may allocate a portion of an outcome amount to each of a given number of events, including in some cases the proactive allocation of $0.00 to certain events. According to yet another embodiment, the controller and/or the gaming device may allocate one or more positive event payout(s), one or more neutral event payout(s) and one or more negative event payout (s) among a given number of events. For example, an allocation of $5.00 over ten events may appear (or be presented) to the player in accordance with the following distribution: +$1.25 for a first event; +$0.50 for a second event; $0.00 for a third event; +$1.00 for a fourth event; −$0.75 for a fifth event; +$5.00 for a sixth event; $0.00 for a seventh event; −$3.00 for an eighth event; +$1.00 for a ninth event and $0.00 for a tenth event (i.e. $1.25+$0.50+$0.00+$1.00+(−$0.75)+$5.00+$0.00+(−$3.00)+$1.00+$0.00=$5.00).

The outcome amount may also be allocated and presented by determining a number of event outcomes based on the outcome amount. Each of the event outcomes may then be associated with one of the total number of events. For example, an outcome amount of $30.00 may initially be divided into event outcomes of $5.00, $15.00, and $10.00. These three event outcomes may then be allocated to three events (e.g., three particular events randomly selected from a total of ten events).

The allocation and presentation of the outcome amount may be based on, for example, a predetermined formula, a stored outcome allocation table, and/or a random process. For example, a controller may use a random process and an allocation formula to divide an outcome amount into event outcomes and/or to select events to be associated with various event results.

In some cases, a total outcome amount may be initially received (e.g. a controller may transmit information to a gaming device indicating that the player is entitled to an outcome value of $2.50 total). According to other embodiments, a number of individual event payouts may be initially received (e.g. by the gaming device). Consider a player who purchases six events via a gaming device (e.g. by establishing a wager with the gaming device). In this case, a controller may transmit information to the gaming device indicating the following six event payout amounts: $0.50, $0.00, $0.75, $0.00, $0.00, and $0.50. The player may then indicate that he or she would like to have these payout amounts revealed in the course of only two events. The gaming device may then, according to one embodiment, consolidate the first three payout amounts into one payout amount (e.g., $0.50+$0.00+$0.75=$1.25) and the last three payout amounts into another individual payout amount (e.g., $0.00+$0.00+$0.50=$0.50). Alternatively, the gaming device may instead consolidate all six of the payout amounts into a single payout amount (e.g. $0.50+$0.00+$0.75+$0.00+$0.00+$0.50=$1.75), and then allocate that single payout amount among two events. Note that the player may request to have an initial payout amount (or number of payout amounts) be re-allocated among a greater or lesser number of events. A player may also request, for example, to have an initial number of payout amounts be re-allocated among the same number of events (e.g., by indicating a modified payout distribution preference).

According to another embodiment, a payout percentage (instead of a monetary amount) is allocated among a total number of events. For example, a player may purchase four events, each event being associated with a payout percentage of sixty percent. The payout percentages may be re-allocated, for example, as follows: twenty percent, eighty percent, and eighty percent.

According to another embodiment, an expected value is allocated among a total number of events. For example, a player may purchase three events, each event being associated with a $2.00 wager amount and having fifty percent probability of winning. Each event, therefore, is associated with an expected value of $1.00. In this case, a player device may allocate the expected value among the events as follows: $0.50, $0.75, $1.75. This may be done, for example, by keeping each event associated with the $2.00 wager amount and adjusting the probability of winning each event to: 0.25, 0.375, and 0.875. Another approach would be to adjust each event wager amount instead of, or along with, the probability of winning. These expected values may also be re-allocated, for example, when the total number of events is modified (e.g. the player requests that the three events be consolidated into two events).

Figure 2:
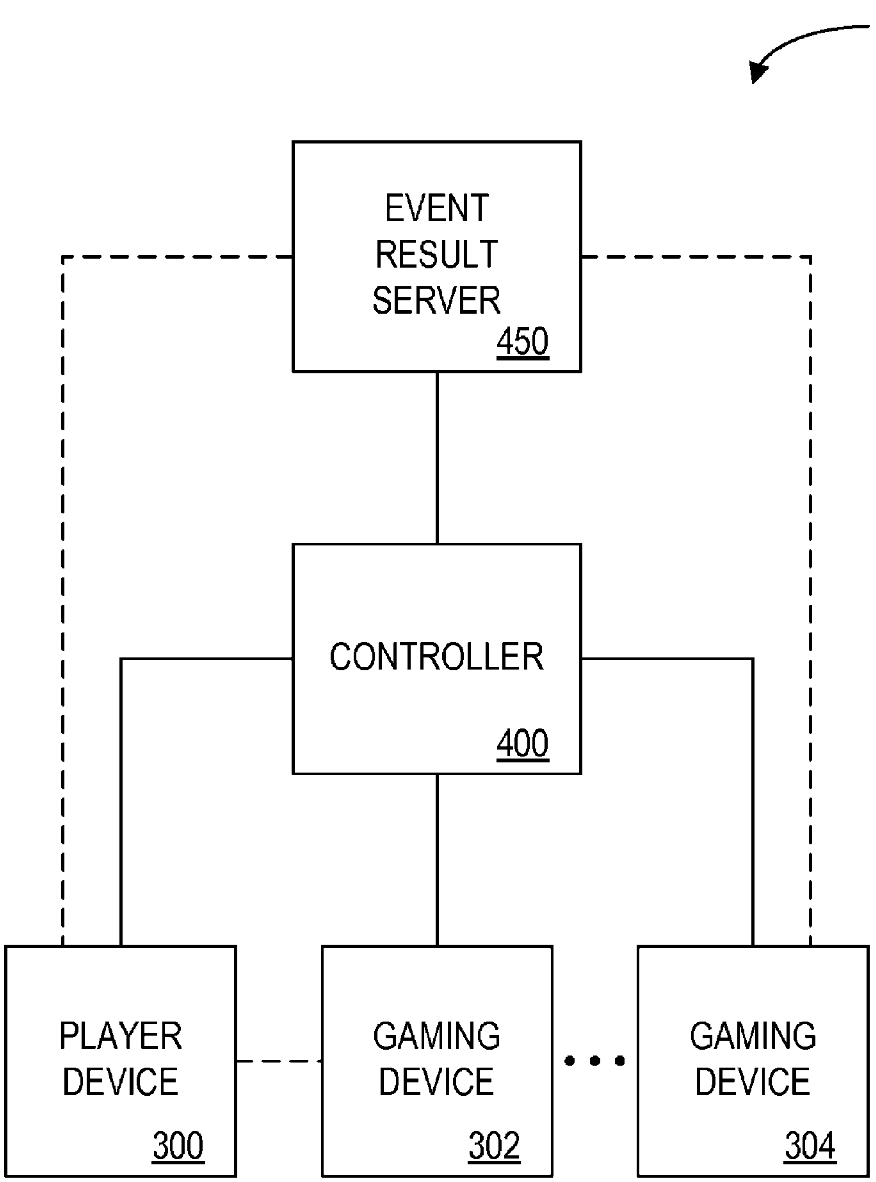
FIG. 2 is a block diagram overview of a gaming system according to an embodiment of the present invention.

FIG. 2 is a block diagram overview of a gaming system 200 according to one embodiment of the present invention. As will be described, the gaming system 200 may be used to indicate event results to a player. The gaming system 200 includes a controller 400 in communication with an event result server 450, a player device 300 and gaming devices 302 and 304. As used herein, devices (such as the event result server 450, the player devices 300, the gaming devices 302 and 304, and/or the controller 400) may communicate, for example, via a communication network, such as a Local Area Network (LAN), a Metropolitan Area Network (MAN), a Wide Area Network (WAN), a Public Switched Telephone Network (PSTN), a Wireless Application Protocol (WAP) network, or an Internet Protocol (IP) network such as the Internet, an intranet or an extranet. Moreover, as used herein, communications include those enabled by wired or wireless technology. Note that although a single controller 400 is shown in FIG. 2, any number of controllers 400 may be included in the gaming system 200. Similarly, any number of the other devices described herein may be included in the gaming system 200 according to embodiments of the present invention.

In one embodiment of the present invention, the player device 300 communicates with a remote, Web-based controller 400 (e.g., a server) through the Internet. Although some embodiments of the present invention are described with respect to information exchanged using a Web site, according to other embodiments information can instead be exchanged, for example, via: a telephone, an Interactive Voice Response Unit (IVRU), electronic mail, a WEBTV® interface, a cable network interface, a proprietary network, and/or a wireless communication system.

The event result server 450 may be any device capable of performing the functions described herein. For example, the event result server 450 may be a server associated with a gaming device operator, owner or manufacturer, and configured to generate and/or transmit event results or a total payout amount.

Similarly, the controller 400, the player device 300 and the gaming devices 302 and 304 may be any device capable of performing the functions described herein. The player device 300 may be, for example: a PC, a portable computing device such as a PDA, a wired or wireless telephone, a one-way or two-way pager, a kiosk (e.g., an instant lottery kiosk located at an airport terminal), an ATM device, a POS terminal, a game terminal (e.g., a slot machine and/or a video poker terminal), a smart card, or any other appropriate storage and/or communication device.

Note that the player device 300 as well as the gaming devices 302 and 304 need not be in constant communication with the controller 400. For example, the player device 300 and/or the gaming devices 302 and 304 may only communicate with the controller 400 when appropriate (e.g., when registering a request for an outcome amount to be presented to a player via a total number of events). The player device 300 and/or the gaming devices 302 and 304 may also communicate with the controller 400 via an Infra Red (IR) port (e.g. when uploading events and/or an outcome amount to a player device such as a PDA and/or wireless phone).

Any of the event result server 450, the player device 300, the controller 400 and/or the gaming devices 302 and 304 may be incorporated in a single device (e.g., a kiosk located on a casino floor may act as both a gaming device 302 and a controller 400).

Figure 3:
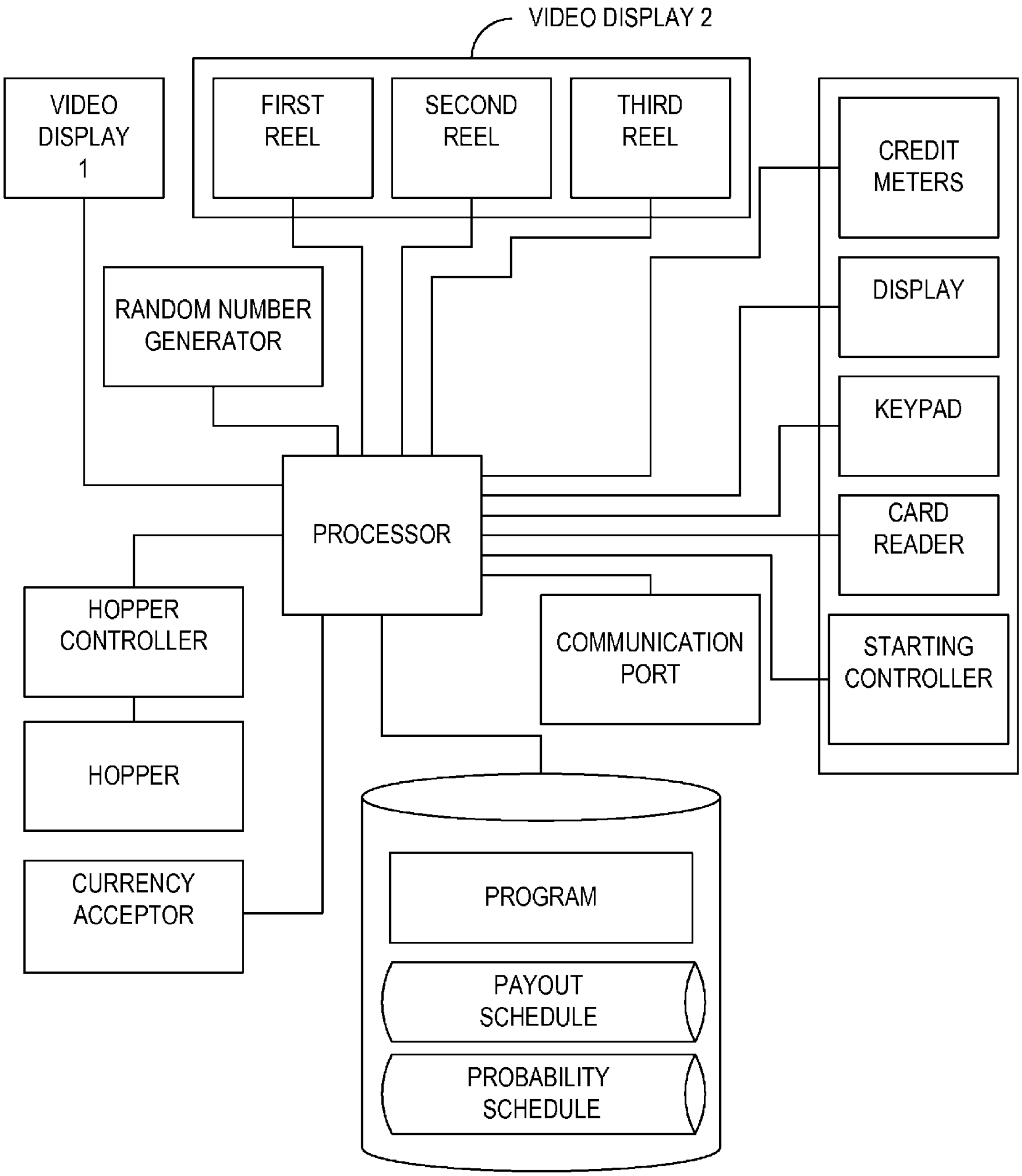
FIG. 3 is a block schematic diagram of a gaming device according to an embodiment of the present invention.

FIG. 3 illustrates an embodiment of a gaming device, though many variations on the depicted embodiment are readily apparent to skilled in the art. Additionally, many variants are disclosed herein, and the present invention is not limited to a particular embodiment of gaming device.

The gaming device comprises a processor, such as one or more Intel® Pentium® processors. The processor is operable to communicate with a random number generator, which may be a component of the gaming device. The random number generator, in accordance with at least one embodiment of the present invention, may generate data representing random or pseudo-random values (referred to as "random numbers" herein). The random number generator may generate a random number every predetermined unit of time (e.g., every thousandth of a second) or in response to an initiation of a game on the gaming device. In the former embodiment, the generated random numbers may be used as they are generated (e.g., the random number generated at substantially the time of game initiation is used for that game) and/or stored for future use. A random number generated by the random number generator may be used by the processor to determine, for example, at least one of an outcome and payout. A random number generator, as used herein, may be embodied as a processor separate from but working in cooperation with the processor.

Alternatively, the random number generator may be embodied as an algorithm, program component, or software stored in the memory of the gaming device and used to generate a random number. Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor may also be operable to communicate with a benefit output device, which can be but need not be a component of gaming device. The benefit output device may comprise one or more devices for outputting a benefit to a player of the gaming device. For example, in one embodiment the gaming device may provide coins and/or tokens as a benefit. In such an embodiment the benefit output device may comprise a hopper and hopper controller, for dispensing coins and/or tokens into a coin tray of the gaming device. In another example, the gaming device may provide a receipt or other document on which there is printed an indication of a benefit (e.g., a cashless gaming receipt that has printed thereon a monetary value, which is redeemable for cash in the amount of the monetary value). In such an embodiment the benefit output device may comprise a printing and document dispensing mechanism.

In yet another example, the gaming device may provide electronic credits as a benefit (which, e.g. may be subsequently converted to coins and/or tokens and dispensed from a hopper into a coin tray). In such an embodiment the benefit output device may comprise a credit meter balance (e.g., as displayed on one or more video displays) and/or a processor that manages the amount of electronic credits that is indicated on a display of a credit meter balance. In yet another example, the gaming device may credit a monetary amount to a financial account associated with a player as a benefit provided to a player. The financial account may be, for example, a credit card account, a debit account, a charge account, a checking account, or a casino account. In such an embodiment the benefit output device may comprise a device for communicating with a server on which the financial account is maintained. Note that, in one or more embodiments, the gaming device may include more than one benefit output device. For example, the gaming device may include both a hopper and hopper controller combination and a credit meter balance. Such a gaming device may be operable to provide more than one type of benefit to a player of the gaming device. A single benefit output device may be operable to output more than one type of benefit. For example, a benefit output device may be operable to increase the balance of credits in a credit meter and communicate with a remote device in order to increase the balance of a financial account associated with a player.

The processor is also operable to communicate with a display device, which may be a component of gaming device. The display device may comprise, for example, one or more video displays or areas for outputting information related to game play on the gaming device, such as a cathode ray tube (CRT) monitor, liquid crystal display (LCD) screen, or light emitting diode (LED) screen. In one or more embodiments, a gaming device may comprise more than one video display devices. For example, a gaming device may comprise an LCD display for displaying electronic reels and a display area that displays rotating mechanical reels.

The processor may also be in communication with one or more other devices besides the display device, for outputting information (e.g., to a player or another device). Such other one or more output devices may also be components of a gaming device. Such other one or more output devices may comprise, for example, an audio speaker (e.g., for outputting an outcome or information related thereto, in addition to or in lieu of such information being output via a display device), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g. rings when a player wins), an LED display of a player's credit balance on a gaming device, an LCD display of a personal digital assistant (PDA) for displaying keno numbers.

The display device may comprise, for example, one or more display areas. For example, one of the display areas may display outcomes of games played on the gaming device (e.g. electronic reels of a gaming device). Another of the display areas may display rules for playing a game of the gaming device. Yet another of the display areas may display the benefits obtainable by playing a game of the gaming device (e.g., in the form of a payout table). In one or more embodiments, the gaming device may include more than one display device, one or more other output devices, or a combination thereof (e.g. two display devices and two audio speakers).

The processor may also be in communication with an input device, which is a device that is capable of receiving an input (e.g. from a player or another device) and which may be a component of gaming device. An input device may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader (or other card reader) to read a player tracking card inserted into a gaming device, a touch screen for input of player selections during game play, and a coin and bill acceptor. Many types of input devices can function (exclusively or partially) as a starting controller which initiates a spin of the gaming device. Handles and buttons are very common types of starting controllers.

The processor may also be in communication with a payment system, which may be a component of the gaming device. The payment system is a device capable of accepting payment from a player (e.g. a bet or initiation of a balance) and/or providing payment to a player (e.g., a payout). Payment is not limited to money, but may also include other types of consideration, including products, services, and alternate currencies. Exemplary methods of accepting payment by the payment system include (i) receiving hard currency (i.e., coins or bills), and accordingly the payment system may comprise a coin or bill acceptor; (ii) receiving an alternate currency (e.g., a paper cashless gaming voucher, a coupon, a non-negotiable token), and accordingly the payment system may comprise a bar code reader or other sensing means; (iii) receiving a payment identifier (e.g. a credit card number, a debit card number, a player tracking card number) and debiting the account identified by the payment identifier; and (iv) determining that a player has performed a value-added activity (e.g., participating in surveys, monitoring remote images for security purposes, referring friends to the casino).

The processor is in communication with a memory and a communications port (e.g., for communicating with one or more other devices). The memory may comprise an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor and the memory may each be, for example: (i) located entirely within a single computer or other device; or (ii) connected to each other by a remote communication medium, such as a serial port cable, telephone line or radio frequency transceiver. In one embodiment, the gaming device may comprise one or more devices that are connected to a remote server computer for maintaining databases.

The memory stores a program for controlling the processor. The processor performs instructions of the program, and thereby operates in accordance with the methods described in detail herein. The program may be stored in a compressed, uncompiled and/or encrypted format. The program furthermore includes program elements that may be necessary, such as an operating system, a database management system and "device drivers" for allowing the processor to interface with computer player devices. Appropriate program elements are known to those skilled in the art, and need not be described in detail herein.

The term "computer-readable medium" as used herein refers to any medium that participates in providing instructions to the processor of the gaming device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the gaming device may obtain instructions in the form of a carrier wave.

According to an embodiment of the present invention, the instructions of the program may be read into a main memory from another computer-readable medium, such from a ROM. Execution of sequences of the instructions in program causes processor perform the process steps described herein. In alternate embodiments, hard-wired circuitry may be used in place of, or in combination with, software instructions for implementation of the processes described herein. Thus, embodiments of the present invention are not limited to any specific combination of hardware and software. As discussed with respect to aforementioned systems, execution of sequences of the instructions in a program of a player device in communication with the gaming device may also cause the processor to perform some of the process steps described herein.

The memory may also store one or more database(s), including e.g. a probability database, a payout database and a bonus characteristic database. Some or all of the data stored in each database is described in conjunction with the following description of the process steps. The described entries of the databases represent exemplary information only; those skilled in the art will understand that the number and content of the entries can be different from those illustrated herein. Further, despite any description of the databases as tables, an object-based model could be used to store and manipulate the data types and likewise, object methods or behaviors can be used to implement the processes described herein.

Note that, although these databases may be described as being stored in a gaming device, in other embodiments of the present invention some or all of these databases may be partially or wholly stored in another device, such as one or more of the player devices, the player device server and/or the server computer. Further, some or all of the data described as being stored in the databases may be partially or wholly stored (in addition to or in lieu of being stored in the memory of the gaming device) in a memory of one or more other devices, such as one or more of the player devices, another gaming device, the player device server and/or the controller computer.

In one or more embodiments, the gaming device may take the form of a slot machine. In light of the present disclosure, gaming devices may be readily configured to operate as specified herein. A description of a slot machine suitable for use with various embodiments follows.

Figure 4:
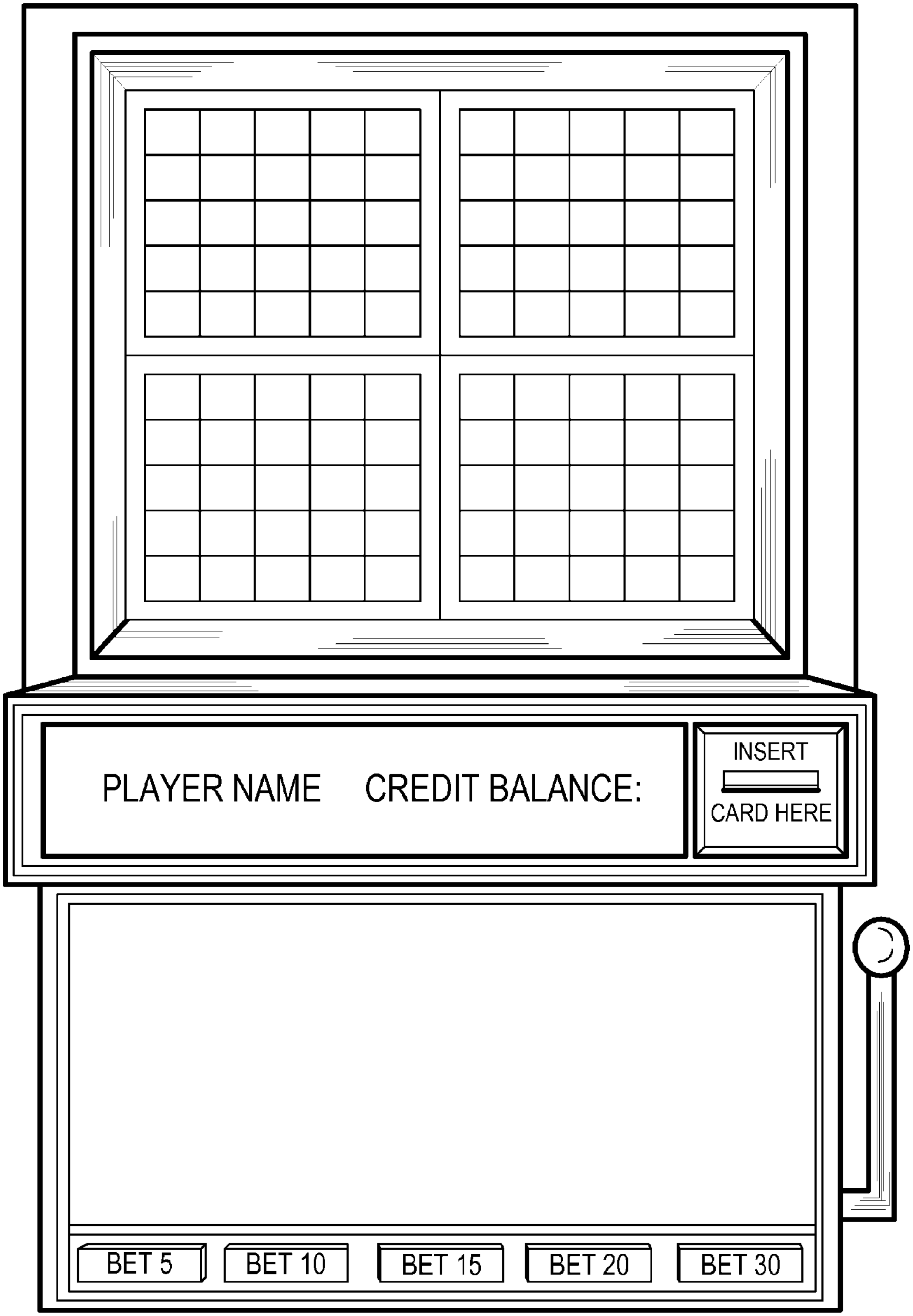
FIG. 4 illustrates a gaming device, such as a slot machine, displaying information according to an embodiment of the present invention.

Generally, a slot machine can comprise, e.g., a three reel or five reel slot machine. Referring to FIG. 4, a slot machine illustrated therein comprises a display area in which an outcome for a game of the slot machine is displayed to the player. The display area may, for example, be a video display that displays graphical representations of reels. The display area may, in another example, be glass behind which are located mechanical reels. Within the display area is a payline. In accordance with one or more embodiments of the present invention, an outcome of a game is a set of symbols displayed along a payline of a reeled slot machine. The slot machine may further comprise a handle. A player may initiate the movement of the reels in the display area by pulling on the handle. Alternatively, a player may initiate the movement of the reels in the display area by actuating one or more start buttons. Either or both of the handle and start button are exemplary embodiments of the input device, described herein.

Where appropriate, the slot machine may also include an alternate, secondary video display, for outputting information to a player. The secondary video display may be utilized, for example, to inform a player of which outcome is an actual outcome or that an outcome that is currently being output is not the actual outcome.

The slot machine may also include a payment system, which is comprised of a bill acceptor, a credit card reader, and a coin acceptor. A player may utilize payment system to provide a wager for playing a game and or for providing payment for provision of an outcome.

The slot machine may further comprise a credit meter balance, which is an exemplary embodiment of a benefit output device that was described herein. The credit meter balance reflects the amount of electronic credits currently available to a player. The electronic credits may be used by a player, for example, as wagers for games played on the gaming device. The electronic credits may also be "cashed out" as coins, bills, tokens, a cashless gaming receipt, and/or credits to another financial account associated with the player.

Finally, the slot machine may comprise a coin tray. Payment to the player may be rendered by dispensing coins into the coin tray. Such coins may be dispensed based on, for example, a player's indication that the player would like to cash out his credit meter balance and/or a payout obtained by a player as a result of playing a game on the slot machine. The coin tray is an exemplary embodiment of the benefit output device, described herein. Note that, where appropriate, the slot machine may include different and/or additional components besides those discussed in this section.

According to an embodiment of the present invention, the player device 300 and/or the gaming devices 302 may receive from a player an indication associated with at least one player-established event parameter. The player-established event parameter may be, for example, (i) a total wager amount, (ii) an indication associated with a total number of events (e.g. a preferred payout distribution or method of presentation associated with the total number of events) and/or (iii) an event wager amount associated with each of the total number of events. The player may, for example, enter a value (e.g., by typing "$5.00" on a keyboard) or select a value from a set of predetermined values (e.g., by using a mouse or other input device to highlight and indicate such value(s)).

Based on the player-established event parameter, at least one other event parameter may be determined by the gaming system 200. For example, the player device 300, the gaming device 302 and/or the controller 400 may calculate an event parameter based on the player-established event parameter. Consider a player who indicates that he or she wishes to receive thirty dollars worth of game play (i.e., the total wager amount equals thirty dollars). The gaming device 302 transmits a request to the controller 400 along with an indication of payment (e.g. information acknowledging receipt of funds equal to the total wager amount). Note that the gaming device 302 may instead communicate directly or indirectly with the event result server 450 (as shown by a dashed line in FIG. 2). Similarly, a player device 300 may communicate directly or indirectly with another player device and/or the gaming devices 302 and 304 (e.g., to transfer wager amounts and/or event results or to play a game involving multiple players).

According to one embodiment, the controller may determine a total payout amount and/or a number of individual event payout amounts based on (i) the total wager amount, (ii) a random or pseudo-random process and/or (iii) a combination of (i) and (ii). For example, the controller 400 may initiate a random number generation process and determine that the player will win twenty-five dollars based on a thirty-dollar total wager amount. According to another embodiment, the gaming device 302 generates a total payout amount and/or a number of individual event payout amounts.

According to another embodiment, the controller 400 receives a set of predetermined event results from the event result server 450. For example, the controller 400 may receive the following set of event payout amounts from the event result server 450: 0, 0, 0, +1, 0, 0, +5, 0, 0, . . . 0. Note that an event result may represent, for example, whether a player has won (e.g., whether the player has, or has not, won a new automobile), a specific dollar amount, or a percentage of an event wager amount. Also note that an event result may represent a negative amount (e.g., the player will lose five dollars as a result of this event).

The set of predetermined event results may be, for example, received by the controller 400 on a periodic or non-periodic basis (e.g., by receiving a batch of results once each week, or by receiving a batch of ten thousand event results when the controller 400 has less than one thousand event results remaining). The set may also be provided to the controller 400 in response to a player's purchase (e.g., the event result server 450 may transmit thirty event results to the controller 400 after the player has paid for thirty event results) or a player's game play (e.g., the event result server 450 may transmit an event result to the player device 300 and/or the gaming devices 302 when it is to be revealed to the player). According to still another embodiment, a set of event results is pre-stored on the gaming device 302 (e.g., in an encrypted format) and individual event results are decoded and revealed to the player in response to receipt of payment.

According to one embodiment, the controller 400 transmits a set of event results to the gaming device 302. According to another embodiment, either the event result server 450 or the controller 400 determines a total payout amount based on a set of event results (e.g. by calculating the total of each event payout amount). An indication associated with the total payout (e.g. twenty-five dollars) is then transmitted to the player device 300 and/or the gaming device 302.

For example, a player may use the player device 300 and/or the gaming device 302 to indicate that he or she wishes to pay thirty dollars (i.e., the total wager amount) and play one hundred electronically represented scratch-off instant lottery games (i.e., the total number of events is one hundred). In this case, the player device 300 may determine that the event wager amount is $0.30 (i.e., thirty dollars divided by one hundred). That is, each of the one hundred lottery games is associated with a $0.30 wager.

According to another embodiment, the one hundred lottery games are not associated with identical event wager amounts. For example, the player and/or the gaming system 200 may determine that the player will receive fifty event results associated with a $0.20 event wager amount and fifty event results associated a $0.40 event wager amount (still representing a thirty dollar total wager amount).

According to one embodiment, the player device 300 also determines an event payout amount for each of the one hundred events. For example, the player device 300 may randomly allocate a twenty-five dollar total payout amount (e.g. based on an indication received from the controller 400) among the one hundred lottery games.

The player device 300 may also be used to indicate (e.g., to display, reveal, and/or transmit) each of the event results to the player. For example, the player may play a card game on the player device 300 and/or the gaming device 302, and the result of the card game may reveal an event payout amount. The controller 400 may also arrange for the player to receive payment of, for example, an event payout amount or the total payout amount using the e.g. a payment identifier such as a credit card or other account number and/or via payment dispersal means at the gaming device 302 (e.g. via a hopper or cash-less gaming receipt printer).

Where appropriate, a probability database may be utilized in the performance of the inventive processes described herein. More specifically, a probability database may be stored in a data storage device (e.g. of the gaming device and/or controller) in tabular form, or any other appropriate database form, as is known in the art.

The data stored therein may include a number of exemplary records or entries, each defining a random number. Those skilled in the art will understand that the probability database may include any number of entries. The tabular representation may also define fields for each of the entries or records. The fields may specify: (i) a random number or range of random numbers that may be generated by a random number generator; (ii) an outcome amount, that indicates the total outcome amount to be presented to a gaming device player based the either (a) the player's total wager and/or, (b) a portion of a total wager associated with a given individual event.

In accordance with various aspects of the present invention, the gaming device and/or the controller may utilize a plurality of probability databases. For example, the gaming device and/or the controller may select an appropriate probability database for use depending on the total wager associated with a given series of events and/or the individual wager amount associated with an individual event.

Alternatively or in addition, a gaming device may utilize a probability database to determine, for example, the event result corresponding to a random number, as may be generated by a random number generator and to present the determined event result in accordance with a reel-based game (e.g. a three-reeled game). For example, the event result may comprise or indicate symbols appearing as representations of reels in a three-reel slot machine-type game.

According to one embodiment, the gaming device and/or the controller may utilize a single probability database. In accordance with such an embodiment, rather than storing information defining actual outcome amounts (e.g. $1.00, $5.00, etc.) the gaming device and/or controller may utilize an appropriate variable in order to determine an appropriate payout, based on an initial wager amount associated with a given number of events. For example, the probability table may store one or more formulas to be applied to a per event wager amount in order to determine an appropriate payout (e.g. "cherry-cherry-cherry"=2.5*(E), where E=the per event wager amount).

Other arrangements of probability databases or probability tables are possible. For example, the book "Winning At Slot Machines" by Jim Regan (Carol Publishing Group Edition, © 1997), the entirety of which is incorporated by reference herein for all purposes, illustrates many examples of probability tables and how they may be derived.

In accordance with various embodiments of the present invention, several approaches may be utilized in graphically conveying an outcome value to a player based on the occurrence of multiple, substantially simultaneous events. One advantage of the present invention lies in the ability to provide a player with an enhanced experience throughout the course of game play by way of providing the player visually entertaining or otherwise appealing manners in which to inform players of individual event results. This particular aspect of the invention may further appeal to gaming system operators in that various methods of event payout presentation may be utilized such that the presentation of multiple event payouts may be executed over a permissible duration of time, so as not to adversely affect wagering volume in the gaming system environment.

Following are several manners in which various events may be presented to gaming device players. Note that the examples listed herein are by no means intended to limit the spirit or scope of the invention and are merely provided as illustrative uses of the invention described herein.

1. According to a first example, a series of events may comprise executing a plurality of graphically represented slot machine games. A player may establish an initial wager with the gaming device and/or the controller and may further specify a number of sets of reels to be displayed on a gaming device display area. For example, a player may establish a $10 balance with the gaming device and request that any resultant outcome value be presented via twenty-five individual sets of graphically represented slot machine reels.

Thereafter, the gaming device and/or the controller may establish or otherwise determine a resultant outcome value to be presented to the player. In this case, the outcome value may be determined based on the initial wager provided by the player and the probabilities associated with various slot machine-type outcomes.

The gaming device may present the player with a 5×5 grid, each location on which represents a set of three slot machine reels. Once the outcome value has been established, the outcome value is indicated to the player by apportioning the outcome value into appropriate event values and assigning the event values to various graphically represented sets of reels. Outcomes associated with the event values are determined and each of the twenty-five reel sets generates a result for viewing by the player. The total of all individual event values is equal to the original outcome value. Once all twenty-five reel sets have displayed their corresponding event results to the player, the outcome value is provided to the player (e.g. by depositing an appropriate amount of currency into a gaming device coin tray and/or printing a receipt redeemable for the outcome value.)

2. Another medium by which a plurality of event values may be efficiently presented to a player is via the graphic representation of certain prevailing qualities indicative of individual event results. For example, size and/or sound may function as a prevailing quality for such purposes.

Consider for example a game wherein a series of events comprises a graphical representation of a firework display (e.g. an individual firework in the display represents an event). In accordance with such an example, various events may overlap or occur simultaneously with respect to other events. In accordance with such an embodiment, the player may be informed of various event values by way of the graphic and/or audible intensity of individual fireworks within the display (e.g. large explosions may be associated with large event values and small explosions may be associated with small event values).

3. Robustness or health is yet another prevailing quality that may be utilized to effectively convey an individual event value.

Consider for example a game wherein a player is presented with a graphical representation of a garden, and wherein each "seed" planted in the garden represents an individual event. In accordance with such an embodiment, the overall health or well being of individual plants as they mature may indicate the event values presented to the player (e.g. the tallest plants, the healthiest plants and/or the plants yielding the most crops may be associated with large event values, while smaller plants or seeds that fail to germinate may be associated with lesser event values).

4. Yet another prevailing quality for use in conveying an event result may be utility (i.e. usefulness).

Consider for example a game format whereby a player wagers by "purchasing" a graphical representation of a jar of coins. In accordance with such an embodiment, the value of the coins in the jar may indicate respective payout values (e.g. pennies=0.01 (total wager amount), nickels=0.05 (total wager amount), wooden nickels=(−0.05) (total wager amount), etc.).

According to one embodiment, the allocation of an outcome amount may depend on, for example, the size of the largest event outcome amount (e.g., an event outcome amount equal to the largest "jackpot" available in a game may always be allocated to the last event).

According to another embodiment, the allocation of an outcome amount is also based on information about the player. The information about the player may include, for example: a location, a player status (e.g. indicating if the player has recently registered with the controller 400 or has previously purchased a large number of events via the controller 400), and/or demographic or consumer profile information.

According to one embodiment, player allocation preferences are dynamically calculated and displayed to the player. For example, as the player adjusts a graphical representation of a sliding scale labeled "event outcome amount variation," a display indicating a minimum outcome amount and a maximum outcome amount may be updated and displayed to the player at each end of the scale.

According to another embodiment, a player may select a pre-determined parameter package from a group of packages (e.g., associated with a set of allocation preferences). According to another embodiment, the gaming system 200 may suggest a particular package, or a modification to one or more allocation preferences, to the player. According to one embodiment, the gaming system 200 may automatically modify one or more allocation preferences.

According to another embodiment, paper game tickets are provided to the player. For example, a player may use a kiosk located at a merchant's store and/or on the floor of a casino to select allocation preferences, and the kiosk may generate a set of paper scratch-off tickets to be played by the player.

According to one embodiment, a player provides payment of individual event wager amounts as corresponding event results are revealed. According to another embodiment, a player may first play a game session and later provide payment to the controller 400 (e.g. at the end of the day).

We claim:

1. A gaming device comprising:

a display device;

an input device;
a processor; and
a tangible memory component storing a program, which when executed by the processor, causes the processor to operate with the display device and the input device to:
receive, from a player, a total wager amount for at least one play of a wagering game, in which the total wager amount is received in at least one payment;
transmit an indication associated with the total wager amount to a controller;
receive an indication associated with a total payout amount from the controller;
receive, from the player, a selection of one of a plurality of different total quantities of wagering game events;
receive a payout distribution parameter from the player;
allocate, based on the payout distribution parameter, the total payout amount among the selected total quantity of wagering game events, said allocation including a determination of a distinct expected value for each of the selected total quantity of wagering game events such that a sum of each of the determined expected values equals the total payout amount;
display at least a portion of the total payout amount in association with the at least one play of the wagering game; and
cause the total payout amount to be provided to the player.

2. The gaming device of claim 1, the gaming device further comprising a random number generator.

3. The gaming device of claim 1, wherein the gaming device comprises at least one of a desktop computer and a mobile computer.

4. The gaming device of claim 1, wherein the gaming device comprises a slot machine.

5. The gaming device of claim 1, in which the payout distribution parameter includes at least one of
a payout frequency parameter, and
a payout magnitude parameter.

6. The gaming device of claim 1, in which the payout distribution parameter includes
a standard deviation associated with the allocation of the total payout amount.

7. The gaming device of claim 1, in which when executed by the processor, the program causes the processor to:
provide the player with an interface which includes at least two buttons;
determine which button was actuated by the player; and
determine, based on which button was actuated by the player, the payout distribution parameter.

8. A gaming device comprising:
a display device;
an input device;
a processor; and
a tangible memory which stores
a program, which when executed by the processor, causes the processor to operate with the display device and the input device to:
receive, from a player, a total wager amount for at least one play of a wagering game, in which the total wager amount is received in at least one payment;
determine, based on the total wager amount, a total payout amount;
receive, from the player, a selection of one of a plurality of different total quantities of wagering game events;
receive a payout distribution parameter from the player;
allocate, based on the payout distribution parameter, the total payout amount among the selected total quantity of wagering game events, said allocation including a determination of a distinct expected value for each of the selected total quantity of wagering game events such that a sum of each of the determined expected values equals the total payout amount;
display at least a portion of the total payout amount in association with the at least one play of the wagering game; and
cause the total payout amount to be paid to the player.

9. The gaming device of claim 8, the gaming device further comprising a random number generator.

10. The gaming device of claim 8, wherein the gaming device comprises at least one of a desktop computer and a mobile computer.

11. The gaming device of claim 8, wherein the gaming device comprises a slot machine.

12. A computing device comprising:
a processor; and
a tangible memory component which stores a program, which when executed by the processor, causes the processor to:
receive a payout distribution parameter from a player playing a wagering game of a gaming device;
determine an outcome amount that is associated with a total quantity of wagering game events that is greater than one; and
allocate, based on the payout distribution parameter, the outcome amount among the total quantity of wagering game events, said allocation including a determination of a distinct expected value for each of the total quantity of wagering game events such that a sum of each of the determined expected values equals the determined outcome amount.

13. The computing device of claim 12, in which the payout distribution parameter received from the player comprises the total number of events.

14. The gaming device of claim 12, in which the payout distribution parameter received from the player comprises at least one of:
a payout frequency preference,
a payout magnitude preference,
a standard deviation associated with said allocating,
a payout order preference,
a total wager amount,
an event wager amount,
a total time period, and
a payout currency preference.

15. The gaming device of claim 12, in which the payout distribution parameter indicates at least one of a payout frequency preference and a payout magnitude preference.

16. The gaming device of claim 12, in which the payout distribution parameter indicates a standard deviation associated with the allocation of the outcome amount.

17. The gaming device of claim 12, wherein when executed by the processor, the program causes the processor to:
retrieve a stored indication of the payout distribution parameter received from the player.

18. The gaming device of claim 12, in which when executed by the processor, the program causes the processor to:
receive the payout distribution parameter via at least one of:
(i) a communication network,
(ii) the Internet, and
(iii) a telephone network.

19. The gaming device of claim 12, in which when executed by the processor, the program causes the processor to receive an indication of the outcome amount.

20. The gaming device of claim 19, in which when executed by the processor the program causes the processor to receive the indication from at least one of:

(i) a player device, (ii) a controller, and (iii) an event result server.

21. The gaming device of claim 19, in which when executed by the processor, the program causes the processor to receive an indication of the outcome amount via at least one of:

(i) a communication network, (ii) the Internet, and (iii) a telephone network.

22. The gaming device of claim 12, in which when executed by the processor, the program causes the processor to:

select a subset of the total quantity of wagering game events; and allocate the outcome amount among the subset of the total quantity of wagering game events.

23. The gaming device of claim 12, in which when executed by the processor, the program causes the processor to:

determine a plurality of event outcomes based on the outcome amount; and associate each of the event outcomes with one of the total quantity of wager game events.

* * * * *